US012777128B2

(12) United States Patent
Frolov

(10) Patent No.: US 12,777,128 B2
(45) Date of Patent: Oct. 27, 2026

(54) SYSTEMS AND METHODS FOR HIGH-FREQUENCY VIDEO ACQUISITION AND PROCESSING

(71) Applicant: Mechanical Solutions Inc., Whippany, NJ (US)

(72) Inventor: Sergey Frolov, New Providence, NJ (US)

(73) Assignee: Mechanical Solutions LLC, Whippany, NJ (US)

( * ) Notice: Subject to any disclaimer, the term of this patent is extended or adjusted under 35 U.S.C. 154(b) by 72 days.

(21) Appl. No.: 18/395,981

(22) Filed: Dec. 26, 2023

(65) Prior Publication Data

US 2025/0211708 A1 Jun. 26, 2025

(51) Int. Cl.
*H04N 5/92* (2006.01)
*H04N 5/783* (2006.01)

(52) U.S. Cl.
CPC ............... *H04N 5/92* (2013.01); *H04N 5/783* (2013.01)

(58) Field of Classification Search
CPC ............. H04N 5/92; H04N 5/783; G01H 9/00
USPC .......................................................... 386/248
See application file for complete search history.

(56) References Cited

U.S. PATENT DOCUMENTS 6,515,734 B1 2/2003 Yamada
7,196,644 B1 3/2007 Anderson et al.
7,701,195 B2 * 4/2010 Griffault .................. H03D 7/18 455/313
7,843,510 B1 11/2010 Ayer et al.
8,786,680 B2 7/2014 Shiratori et al.
9,514,766 B1 * 12/2016 Joshi ..................... G10L 21/049
10,593,167 B2 3/2020 Gervais et al.
11,100,654 B1 * 8/2021 Piety ..................... G06T 7/0004
11,287,517 B2 * 3/2022 Dehlinger ............. G01S 17/894
11,341,658 B1 * 5/2022 Piety ....................... G06T 7/248
11,395,203 B2 * 7/2022 Logothetis .......... H04W 36/083
11,514,583 B1 * 11/2022 Hay ....................... H04N 7/188
11,722,940 B2 * 8/2023 Logothetis ........ H04W 56/0035 455/436
2008/0225125 A1 9/2008 Silverstein
2009/0139334 A1 6/2009 Mustonen
2011/0080211 A1 4/2011 Yang et al.
(Continued)

FOREIGN PATENT DOCUMENTS

WO WO2014024121 2/2014
WO WO2019222833 11/2019

OTHER PUBLICATIONS

Strickling. W.; Shadow bands during a total solar eclipse; last updated Sep. 17, 2017; http://www.strickling.net/shadowbands.htm; 5 Pages.

(Continued)

*Primary Examiner* — Helen Shibru
(74) *Attorney, Agent, or Firm* — Schmeiser Olsen PLLC

(57) ABSTRACT

A method for high-frequency video acquisition comprises providing a video sensor, providing a target area, providing at least two frame rates, capturing at least two videos of the target area at the at least two frame rates, analyzing the at least two videos and producing corresponding frequency spectra, determining and comparing observed signal frequencies in the corresponding frequency spectra, and determining an actual signal frequency. Related systems and computer program products are also provided.

20 Claims, 11 Drawing Sheets

(56) References Cited

U.S. PATENT DOCUMENTS

| | | | |
|---|---|---|---|
| 2013/0002968 A1 | 1/2013 | Bridge et al. | |
| 2013/0122845 A1 | 5/2013 | Loewenstein | |
| 2014/0375848 A1 | 12/2014 | Yamamoto | |
| 2015/0324636 A1 | 11/2015 | Bentley et al. | |
| 2016/0217587 A1 | 7/2016 | Hay | |
| 2016/0273957 A1 | 9/2016 | Bendele et al. | |
| 2017/0169575 A1 | 6/2017 | Perez Acal et al. | |
| 2020/0175660 A1 | 6/2020 | Iijima | |

OTHER PUBLICATIONS

Chen, J. et al.; Video Camera-Based Vibration Measurement for Civil Infrastructure Applications; Journal of Infrastructure Systems; 23(3); Dec. 8, 2016; 11 Pages.

Dunton, T.; "An Introduction to Time Waveform Analysis"; https://reliabilityweb.com/articles/entry/an_introduction_to_time_waveform_analysis; 2020.

Braun, S.; The Synchronous (time domain) average revisited; Mechanical Systems and Signal Processing; May 2011; pp. 1087-1102; vol. 25.

Gao, Z. et al.; Averaging video sequences to improve action recognition; 2016 9th International Congress on Image and Signal Processing; BioMedical Engineering and Informatics (CISP-BMEI); Datong; 2016, pp. 89-93.

Mehrubeoglu, M. et al.; Object tracking using multiple camera video streams; SPIE Proceedings; Apr. 2010; 10 pages; vol. 7724; DOI:10.1117/12.854091.

Petitjean, F. et al.; Summarizing a set of time series by averaging: From Steiner sequence to compact multiple alignment; Theoretical Computer Science; 2012; pp. 76-91; vol. 414, Issue 1.

Diego, F.; Probabilistic Alignment of Video Sequences recorded by Moving Cameras; Universitat Autonoma de Barcelona; Jul. 22, 2011; 154 Pages.

Lu, C. et al.; A Robust Technique for Motion-Based Video Sequences Temporal Alignment; IEEE Transactions on Multimedia; Oct. 16, 2012; pp. 70-82; vol. 15, Issue 1; DOI: 10.1109/TMM.2012.2225036.

Caspi, Y. et al.; A step towards sequence-to-sequence alignment; Proceedings IEEE Conference on Computer Vision and Pattern Recognition. CVPR 2000 (Cat. No. PR00662); Hilton Head Island, SC; Jun. 15, 2000; DOI: 10.1109/CVPR.2000.854940.

* cited by examiner

SYSTEMS AND METHODS FOR HIGH-FREQUENCY VIDEO ACQUISITION AND PROCESSING

TECHNICAL FIELD

The present invention relates to methods for observation and detection of motion, for example, vibration, rotation, and/or translational displacement of an object at high frequencies. The systems and methods may include or use multiple recordings from a camera system. The multiple recordings may also be multiple recordings of the same field of view. Related systems and computer program products are also disclosed.

BACKGROUND

Detection systems such as camera systems or other sensor systems are used to detect and observe various types of motion. For example, camera systems are often used with rotating equipment and other machinery to detect and/or observe motion as part of analysis processes, maintenance processes, and the like. With respect to such equipment and machinery, even small motions and vibrations may be important. For example, vibrations may indicate improper operation, worn or defective components, or other problems that reduce efficiency, damage equipment, or are otherwise undesirable. Thus, detection of even small vibrations may be beneficial; however, camera systems often reach a fundamental limit past which vibrations are too small or occur at too high frequencies to be detected.

This limit is often related to the frame rate and field of view of the camera. For example, many camera systems are only able to capture a full field of view at a specific frame rate. However, that specific frame rate may not be sufficient to capture vibrations, especially small motions or vibrations that occur very quickly or at too high frequencies, e.g., shock pulses. For a given frame rate (or more generally a data sampling rate) $R_f$, the upper frequency resolution limit is known as the Nyquist frequency, $F_N$, equal to $R_f/2$. Adjusting the field of view to a smaller area may allow for an increased frame rate $R_f$ using the same camera or camera system and correspondingly higher $F_N$. However, the smaller area may not capture the entire area of interest and thus may not capture the desired motion/vibration or may miss a portion thereof.

Thus, systems and methods for providing improved high-rate or high-frequency video recording and processing for vibration and motion data acquisition would be well received in the art.

SUMMARY

An embodiment of the present invention relates to a method for high-frequency video acquisition, comprising providing a video sensor, providing a target area, providing at least two frame rates, capturing at least two videos of the target area at the at least two frame rates, analyzing the at least two videos and producing corresponding frequency spectra, determining and comparing observed signal frequencies in the corresponding frequency spectra, and determining an actual signal frequency.

A further embodiment of the present invention relates to a computer program product comprising a computer readable hardware storage device storing a computer readable program code, the computer readable program code comprising an algorithm that when executed by a computer processor of a computing system implements a method for high-frequency video acquisition, the method comprising providing at least two videos of a target area, wherein the at least two videos are at different frame rates, analyzing the at least two videos and producing corresponding frequency spectra, determining and comparing observed signal frequencies in the corresponding frequency spectra, and determining an actual signal frequency.

A further embodiment of the present invention relates to a method for high-frequency video acquisition, comprising capturing a first video of a target area, wherein the first video is captured at a first frame rate, analyzing the first video and determining a first observed signal frequency in the first video, capturing a second video of the target area, wherein the second video is captured at a second frame rate, analyzing the second video and determining a second observed signal frequency in the second video, comparing the first observed signal frequency and the second observed signal frequency, and determining an actual signal frequency.

DETAILED DESCRIPTION

Figure 1:
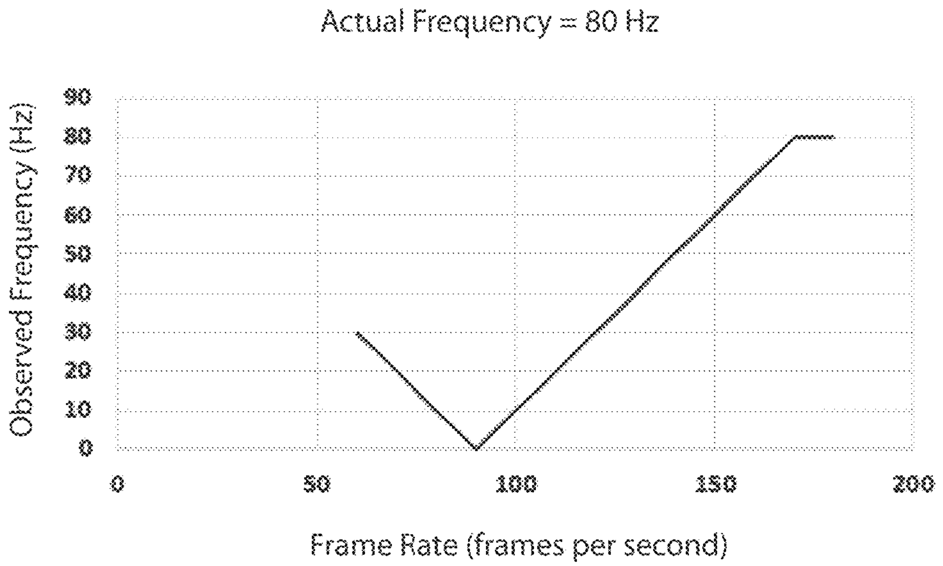
FIG. 1 depicts an example of observed frequencies for an exemplary 80 Hz signal at different frame rates.

Motion and vibration detection may be important for analysis of machinery condition and operating state, for example, in rotating machinery, manufacturing equipment, transportation equipment, oil and gas equipment, power generation machinery, and other systems, comprising pumps, compressors, turbines, expanders, piping, pressure vessels, etc. Detection of even small motions and vibrations may be needed to provide a proper analysis of the machinery/system; however, detection of such small motions and vibrations may be difficult or impossible due to limits in the frame rate of a camera or camera system, especially when the motion/vibration occurs at a high frequency. For example, the camera system may not be able to accurately detect high frequency motion or vibration due to a video frame rate that is too low. As discussed above, for a given frame rate $R_f$, the upper frequency resolution limit is known as the Nyquist frequency $F_N$ and is equal to $R_f/2$.

Additionally, lower cost cameras that otherwise may have very good performance, e.g., a low noise floor, are limited to relatively low frame rates (e.g. <100 frames per second), thus requiring the expense of higher-end cameras for use cases where the characteristic motion or vibration frequencies are relatively high (e.g. >100 Hz) and thus may need high-frequency video acquisition and processing. Further still, in cases where frequencies of interest exceed 200 Hz, even high-end cameras may not have a frame rate that is sufficiently high, particularly when a large or maximum field of view is used (e.g., requiring the use of the maximum resolution of a video sensor).

In cameras, where video images can be acquired using different image resolutions or video frame sizes, the maximum achievable acquisition frame rate may often be related to the size of the video sensor area that is utilized in the image capture. A camera may contain a video or an image sensor, which is composed of an array of light-sensing detectors or pixels, typically a rectangular array. For a given camera resolution, which corresponds to certain screen width and height, i.e., the number of pixels in corresponding directions, the camera may be able to operate in the range of frame rates up to the maximum frame rate, which may be higher for lower resolutions (i.e., smaller widths and/or heights). For example, a camera may have a certain base maximum frame rate when capturing images using the entire video sensor area, corresponding to the full field of view for the camera. However, the same camera may be capable of achieving a higher frame rate when capturing images using a smaller part of the video sensor, corresponding to a subset of the full field of view (e.g., using a smaller number of pixel rows in the video sensor).

This effect may be easily illustrated by considering that a typical video sensor is a rectangular array of pixels characterized by numbers of rows and columns, i.e., its height and width, respectively. Depending on the sensor design, the amount of time required to process the full video frame is proportional either to the total amount of used pixels or the number of used pixel rows. Therefore, configuring the sensor to use a smaller number of pixels or pixel rows may lead to a shorter acquisition time and a correspondingly higher frame rate, which is the inverse of the time interval between successive video frames.

For example, the maximum frame rate may increase as the height of the utilized area on the video sensor decreases, i.e., in this case the frame rate may increase with decreasing height of the utilized field of view. However, because of the decrease in the utilized field of view, the entire area of interest may not be captured and thus some or all portions of the desired motion or vibration may be missed.

Embodiments of the disclosed invention may allow a full field-of-view video processing and analysis at frequencies higher than the Nyquist frequency $F_N$ by using multiple recordings of the same target area at different frame rates. For example, recordings of a target object or target area may be captured by a sensor system or a camera system at two different frame rates $R_{f1}$ and $R_{f2}$, respectively. The video data from the recordings may be produced in the form of time-series data sets, in which for example each video pixel may provide a time-series signal where each time corresponds to a particular frame. These time-series data may then be processed by applying a frequency domain transform, such as a Fourier transform or more specifically a fast Fourier transform (FFT). Generally, other mathematical transforms may also be used, e.g., wavelet transforms.

If the target area contains a source of a high frequency signal in excess of the Nyquist frequency, it will produce a signal in the frequency domain at a so-called aliased frequency or an observed frequency that is smaller than the actual frequency. This down-shift in frequency depends on the camera frame rate as follows:

$$F_o = |F_a - R_f * N|, \qquad \text{(Equation 1)}$$

where $F_o$ is the observed signal frequency, $F_a$ is the actual frequency, $R_f$ is the frame rate and N is an integer equal to the rounded ratio of $F_a/R_f$.

Figure 2:
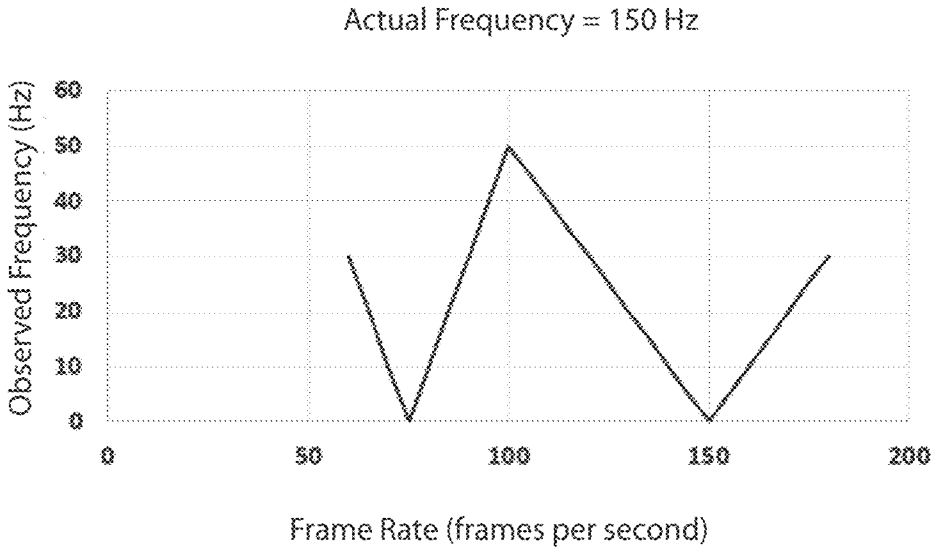
FIG. 2 depicts an example of observed frequencies for an exemplary 150 Hz signal at different frame rates.

FIGS. 1 and 2 show examples of this dependency for two different actual frequency $F_a$ values: 80 Hz and 150 Hz, respectively. As can be seen, despite actual frequencies of 80 Hz and 150 Hz, respectively, the observed frequencies are often lower. For example, frame rates of approximately 160 fps are required to accurately visualize the 80 Hz signal as shown in FIG. 1. As shown in FIG. 2, even frame rates approaching 200 fps are not able to accurately visualize the 150 Hz signal; instead, all observed frequencies are significantly lower.

If the observed frequency $F_o$ is aliased, its value may be different for different frame rates, for example, as shown by the varying observed frequencies in FIGS. 1 and 2. Thus, the actual frequency can be determined by comparing and analyzing FFT spectra produced at different frame rates, for example $FFT_1$ and $FFT_2$ spectra corresponding to $R_{f1}$ and $R_{f2}$ frame rates. Using Equation 1, the equation for the actual frequency can written as follows:

$$F_a = R_f * N + / - F_o. \qquad \text{(Equation 2)}$$

The value of N and the sign in Equation 2 can then be determined from the comparison between the $FFT_1$ and $FFT_2$ spectra, as discussed in more detail in the following examples.

Figure 3:
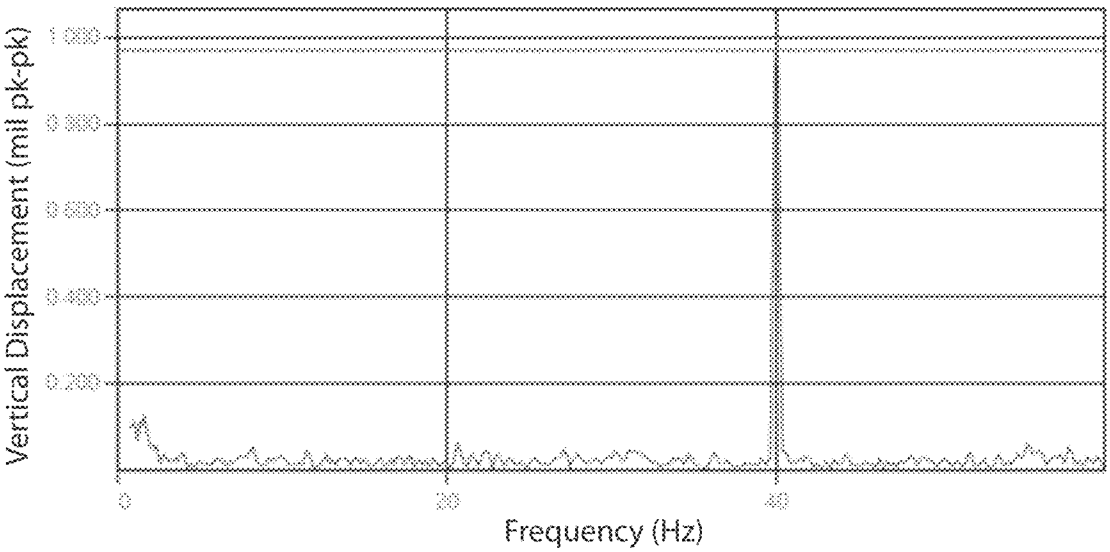
FIG. 3 depicts an example of an FFT spectra for an exemplary 80 Hz signal acquired at a frame rate of 120 Hz.
Figure 4:
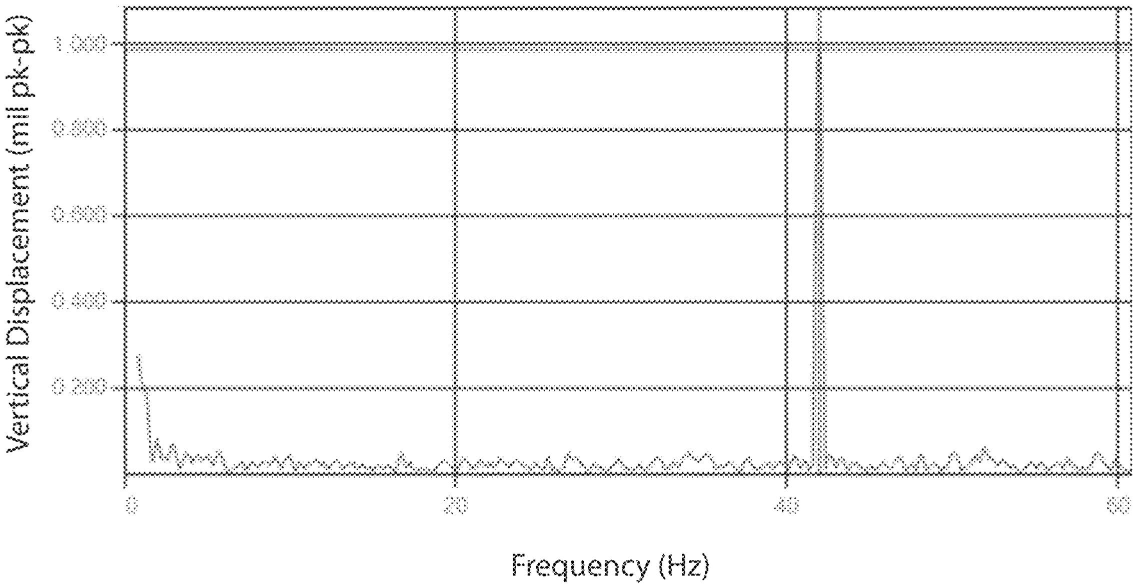
FIG. 4 depicts an example of an FFT spectra for an exemplary 80 Hz signal acquired at a frame rate of 122 Hz.

FIGS. 3 and 4 show the $FFT_1$ and $FFT_2$ spectra of the same video signal with an actual frequency at 80 Hz, which was acquired at two different frame rates: 120 Hz and 122 Hz, respectively. The observed frequencies in this case are correspondingly 40 Hz and 42 Hz. The frequency shift of 2 Hz between these observed frequencies is equal to the frequency shift between the corresponding frame rates, which implies that N is equal to 1 in accordance with Equation 2. Because the observed frequency increases with the frame rate so that $F_{o1}<F_{o2}$, the sign in Equation 2 is negative in this case. Thus, the actual frequency $F_a$ of 80 Hz can be determined using Equation 2 with N=1 and the negative sign by substituting either $F_{o1}$ and $R_{f1}$, or $F_{o2}$ and $R_{f2}$ pairs of values.

Figure 5:
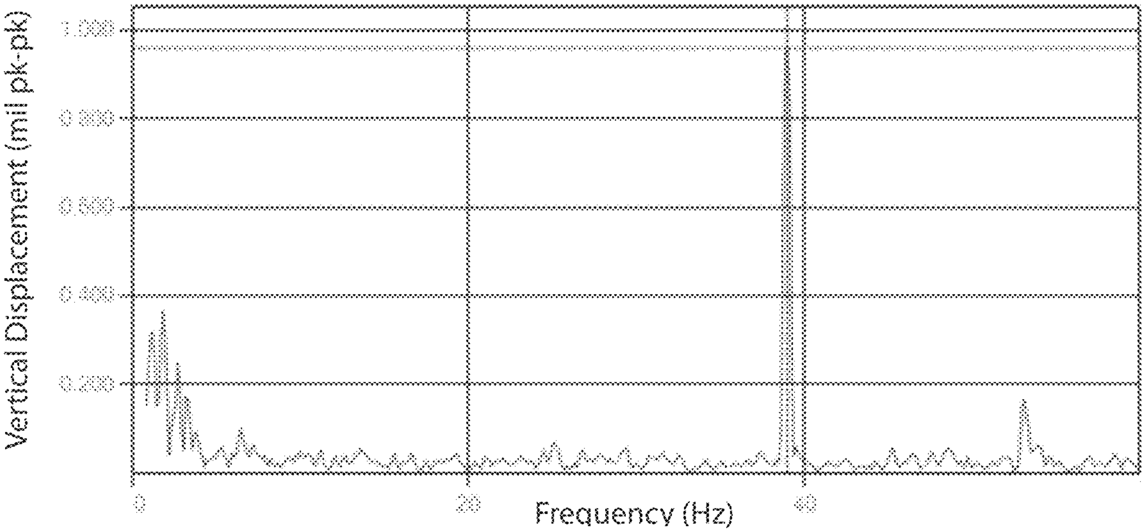
FIG. 5 depicts an example of an FFT spectra for an exemplary 159 Hz signal acquired at a frame rate of 120 Hz.
Figure 6:
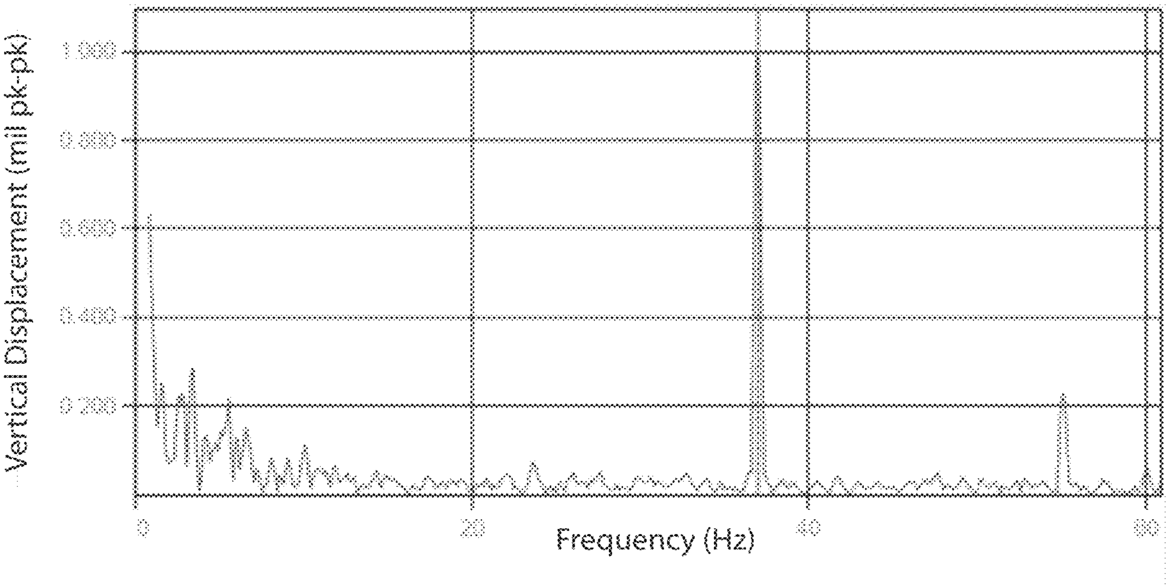
FIG. 6 depicts an example of an FFT spectra for an exemplary 159 Hz signal acquired at a frame rate of 122 Hz.

Furthermore, FIGS. 5 and 6 show the $FFT_1$ and $FFT_2$ spectra of the same signal with an actual frequency at 159 Hz, which was acquired at two different frame rates: 120 Hz and 122 Hz, respectively. The observed frequencies in this case are correspondingly 39 Hz and 37 Hz. The frequency shift of 2 Hz between the observed frequencies is equal to the frequency shift between the corresponding frame rates, which implies that N is equal to 1 in accordance with Equation 2. Because the observed frequency decreases with the frame rate so that $F_{o1}>F_{o2}$, the sign in Equation 2 is positive in this case. Thus, the actual frequency $F_a$ of 159 Hz can be determined using Equation 2 with N=1 and the positive sign by using either $F_{o1}$ and $R_{f1}$, or $F_{o2}$ and $R_{f2}$ pairs of values.

It is typical for video acquisition at high frame rates to choose the longest possible exposure time in order to maximize the amount of light detected by a video sensor at each of its pixels. For example, the exposure time may be set equal to or near the inverse of the frame rate, i.e., the frame interval. This improves the video quality and requires less illumination for a target area. However, due to the finite exposure time, an imaging video sensor responsivity at high frequencies may be reduced as a result. This effect is equivalent to applying a low-pass frequency filter, in which aliased frequencies are attenuated with respect to non-aliased frequencies. In typical use cases, this may be a desired beneficial outcome, e.g., electronic sensors often incorporate low-pass filters to eliminate aliasing all together.

For the purposes of embodiments of this invention, however, it may be preferable to maintain high responsivity at high frequencies and avoid its reduction due to low-pass filtering caused by the finite exposure time. In embodiments, this can be achieved by reducing the frame exposure time to a fraction of the frame interval. For example, in order to detect signal frequencies up to $F_N$*m, where m is an integer, the exposure time may be set equal to or less than about $1/(R_f{*}m)$. The smaller is the exposure time, the lower is the signal attenuation at high frequencies and the higher is the frequency cut-off before the signal attenuation is too high for video detection. In order to compensate for the reduction in the exposure time, either additional illumination sources may be used or electronic gain applied at the sensor level. In some cases, a trade-off may be required for achieving an optimum exposure time, in which the exposure time is sufficiently low for avoiding low-pass filtering while also allowing sufficient amount of light to be captured by a video sensor. This trade-off may be dictated by specific use case requirements and conditions, such as expected magnitudes of actual vibration frequencies and vibration magnitudes, as well as available illumination sources.

Alternatively, or in addition to the exposure time reduction, a responsivity correction factor may be applied to the extracted signal data in the frequency domain. This correction may serve to compensate for at least some responsivity reduction or modification in a sensor and/or video system within the frequency range of interest, and especially at high frequencies. For example, exposure correction can be applied for motions at high frequencies, as described in the U.S. patent application Ser. No. 17/951,961, the entire contents of which are hereby incorporated by reference.

Figure 7:
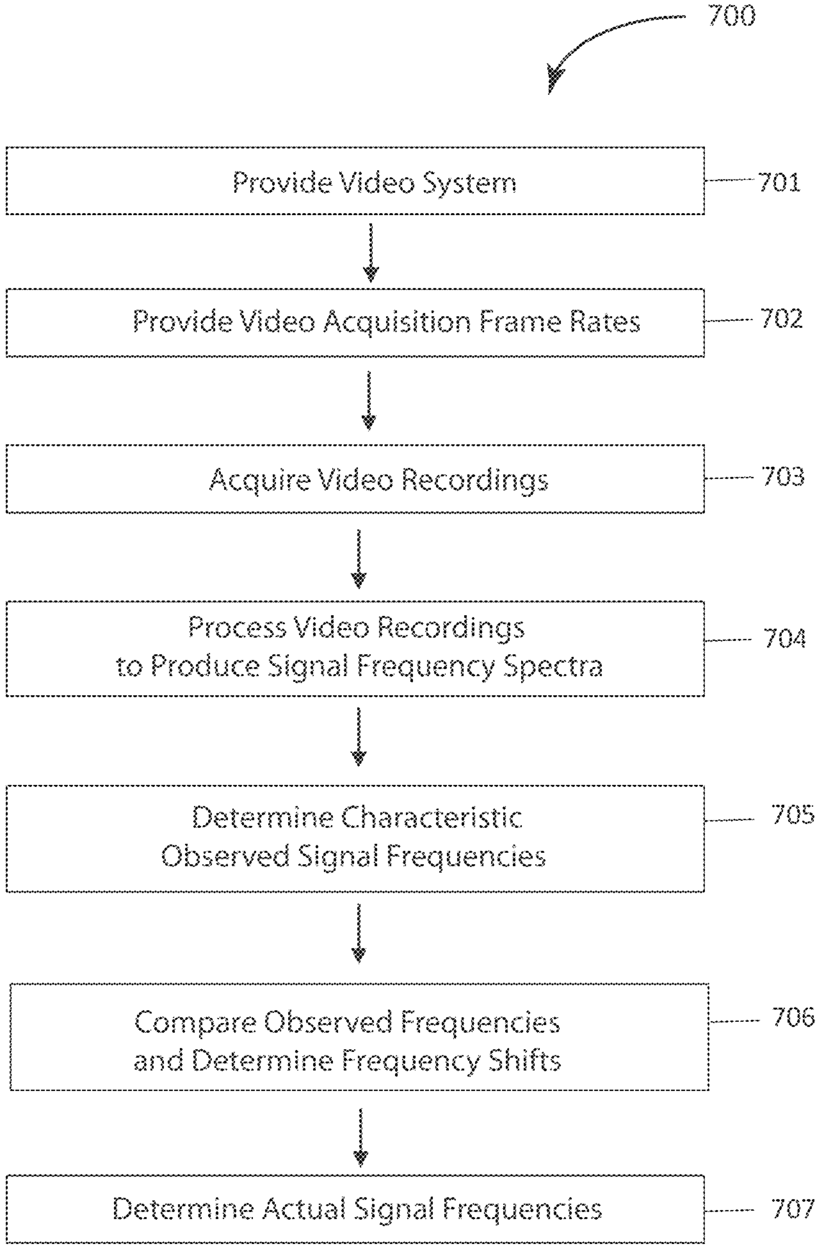
FIG. 7 depicts a flow chart of a method for acquiring and processing high frequency video signals according to embodiments of the present invention.

According to embodiments, FIG. 7 shows a method 700 for acquiring and processing high frequency video signals. In step 701, a video system is provided. The video system may have a field of view and an exposure time. The field of view may comprise a target area. In embodiments, the target area may comprise a rotating machine or other object. In step 702, at least two different video acquisition frame rates are provided. For example, the video acquisition frames rates may be selected from a plurality of options, may be set by default, may be chosen by a user, and the like. In step 703, at least two video recordings are acquired at the selected frame rates. In step 704, the acquired videos are analyzed, i.e., are processed. For example, in embodiments the analysis/processing may be used to produce corresponding signal frequency spectra for the video recordings. In step 705, characteristic observed signal frequencies are determined in each frequency spectrum. In step 706, the observed frequencies are compared and frequency shifts between correlated characteristic frequencies are determined. In step 707, the actual signal frequency is determined from the observed frequencies. For example, the actual signal frequency may be determined as has been discussed above. In embodiments, determining the actual frequency may comprise correlating observed signal frequencies, for example, between the at least two videos, and calculating a frequency shift between the correlated observed frequencies.

In embodiments, the steps or functions noted in the blocks may occur out of the order noted in the Figure. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. Still further, in embodiments, steps may be omitted and/or additional steps may be included.

Figure 8:
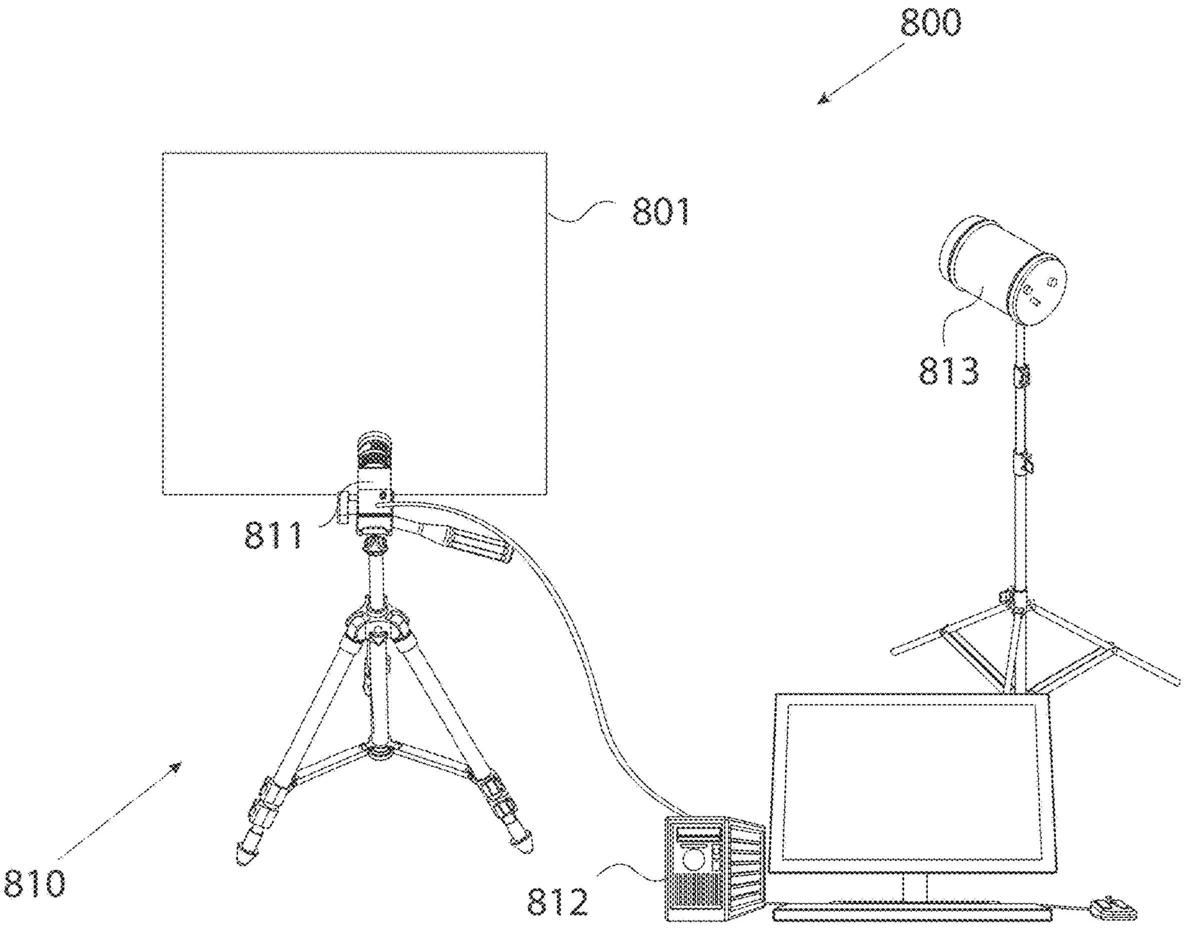
FIG. 8 depicts a schematic view of a high frequency video system for acquiring and processing high frequency video signals according to embodiments of the present invention.

FIG. 8 depicts an example of a high frequency video system 800 configured to implement embodiments of the present invention. The video system 800 may have a field of view including a target area 801 as discussed in more detail below. The video system 800 includes a sensor system 810. The sensor system 810 comprises at least one sensor device 811. The sensor system 810 may comprise a camera system in which the at least one sensor 811 comprises a camera device. For example, the sensor system may be capable of capturing video over a time interval. In such embodiments, the at least one sensor 811 may be referred to as a video sensor and the sensor system 810 may be referred to as a video sensor system. The sensor system 810 may also include a light source such as light source 813 to provide illumination for a target area.

Referring still to FIG. 8, the sensor system 810 may comprise, or may be in communication with, a processor 812, for example, a processor of a computing system. The processor 812 may control the at least one sensor device 811. The processor 812 may also be configured to process and/or analyze information from the at least one sensor device 811, for example, video captured by the at least one sensor.

In embodiments, the sensor device 811 may comprise a sensor or a sensor array for capturing optical images or other serialized measurements (e.g., in optical or electronic scanning). The sensor array may be for example an image sensor comprising a rectangular imaging array of light detectors, such as imaging pixels. The image sensor may be configured to operate either a full pixel array or a part of the array. In the latter case, an image such as a frame of a video may be recorded only by a subset of the available pixels in a selected part of the image sensor. The processor 812 may be used to control the sensor device 811 and configure its operation, e.g., by selecting an active part of the image sensor and configuring what pixels may record images during video recordings or other measurements. The processor 812 may be either an internal processor integrated with the sensor device 811 or an external processor (e.g., a computer) connected externally to the sensor device 811. Furthermore, multiple processors may be used to control the sensor device 811, e.g., a combination of an internal and external processor or processors. Also, a single external processor may be used to control multiple sensor devices.

In embodiments, the sensor system 810 and/or the at least one sensor device 811 may be intended to capture video of an object (not shown) in the target area 801 for which motion and/or vibration is to be detected. In embodiments, the object may be, for example, a rotating machine or a component of the rotating machine. The object may be any type of object for which detection is desired.

The full field of view may be defined by the size and geometry of an image or other sensor in the sensor device, e.g., by a projection of this sensor on the target area. In case of the optical projection via a lens, the geometry of the sensor and its sections will be projected onto the geometry of the full field of view and its sections in the target area. For each recording, the sensor system 810 and/or the at least one sensor device 811 may capture a data set of sensor information, such as a plurality of image frames, all or a portion of pixels of multiple image frames, image pixels, sections of video files, entire video files, data relating to such images, data related to such pixels, data related to such frames, and the like.

In embodiments, different frame rates may be used to produce multiple video recordings. For example, $R_{f1}$ and $R_{f2}$ frame rates may be used to acquire two different video recordings. The frame rate difference ($\Delta R_f = R_{f1} - R_{f2}$) determines the minimum frequency shift for aliased frequencies. Therefore, in embodiments, the frame rate difference has to be larger than the smallest bin size in the produced signal frequency spectra, i.e., the frequency resolution or frequency step size in an FFT spectrum. The bin size in an FFT spectrum is given by $1/\Delta T$, where $\Delta T$ is the time span or duration of a video recording. Thus, in embodiments it may be preferable to have a frame rate difference equal or greater than $1/\Delta T_{min}$, where $\Delta T_{min}$ is the time duration of the shortest video recording.

Furthermore, to simplify a comparative analysis between different FFT spectra from different video recordings, it may be preferable to have a relatively small frame rate difference, i.e., $\Delta R_f \ll R_{f1}, R_{f2}$ in embodiments. For example, $\Delta R_f$ may be less or equal to 10% of $R_{f1}$ and $R_{f2}$. This condition helps to produce FFT spectra that are similar to each other, simplify the frequency analysis, and identify correlated observed signal frequencies. In addition, the time duration of each recording may be maintained the same, to ensure the same bin size in the signal FFT spectra, which in turn also simplifies the comparative frequency analysis. In general, however, the FFT spectra can be compared even when their respective frequency bin sizes and spans are different.

In embodiments, the sensor system 810 and/or the at least one sensor device 811 may be configured to capture data, such as video, of the target area 801 using multiple recordings. The multiple recordings may be produced using either a single sensor device 811 or multiple sensor devices. The multiple recordings may be produced sequentially, or simultaneously if they are produced by different sensor devices. The multiple recordings may have the same resolution, field of view, and time duration. In embodiments, it may be preferable to also maintain the same level of illumination. Alternatively, the multiple recordings may have different resolutions, fields of view, and time durations. In the latter case, the selected fields of view may have overlapping parts containing objects of interest. It is also possible to use non-overlapping fields of view, which contain video signals at the same actual frequencies of interest.

Embodiments of the disclosed invention in part make use of the repetitive nature of vibrations and rotations in machinery, as well as other repeating events. Because the nature of the motion or vibration is the same or similar throughout the full acquisition time, i.e., even over the plurality of recordings, various recordings of different sections may be captured over time, synchronized and then combined, averaged or assembled together for further analysis or to produce a composite video or a composite data set.

The plurality of recordings may be synchronized to ensure accurate comparison and analysis. In embodiments, a synchronization source may be provided and the step of capturing may be synchronized to the synchronization source. Synchronization may be achieved using a number of different methods, for example, by using an external electronic synchronization signal from an electronic sensor, an optical sensor or other electro-mechanical components, and/or by recording a common reference area, and/or by having a direct or indirect synchronization to an object, and/or by having a direct or indirect synchronization to an event, motion or feature of the object, such as for example a phase of a periodic motion or vibration of the object.

For example, in an embodiment, the sensor system 810 and/or the at least one sensor device 811 may synchronize the individual recording or capturing of data. Video recording synchronization may be accomplished by several suitable methods, including, for example, time stamping, electronic triggering, pre- or post-acquisition data analyses, and other means. In an embodiment, synchronization may be achieved by synchronizing the start time of each video recording. In embodiments, each video recording may have a consistent or constant duration as well. As an example, in an embodiment each recording may be 10 seconds in length. Alternatively, the video files may be any time in duration or any number of frames in length.

Additionally, in some embodiments, the plurality of video recordings may be synchronized with each other by using a motion of an object as a timing reference. For example, the sensor system 810 and/or the at least one sensor device 811 may be synchronized to a dynamic event of an object or to a dynamic event associated with the object. In some embodiments the sensor system 810 and/or the at least one sensor device 811 may be synchronized to a timing of the object or other aspect of the object. In some embodiments, the dynamic event of an object may be an expected or known motion. In embodiments where the object is a rotating machine, the at least one sensor device 811 may be synchronized to the rotation of the rotating machine, i.e., the dynamic event may be the rotational position of the rotating machine, phase of the machine, or the like. In other embodiments, the dynamic event may be an impulse on the object or the timing of some other action taken by, or taken with respect to, the object. Synchronization of the at least one sensor device 811 may be of any kind, for example, direct or indirect, optical, electrical, or mechanical, and the like. In some embodiments, synchronization may be accomplished by at least one of a key phasor, directly measured vibration, recording frames at a known rate, excitation source, and the like. Synchronization of video recordings may entail that each respective recording begins at a common point with respect to the motion of an object of interest.

In embodiments, at least two video recordings may be acquired at different frame rates, as described above. Additional recordings may be acquired at different frame rates, which may improve accuracy in evaluating actual signal frequencies and avoid ambiguities in cases where the different observed frequencies overlap or fall outside the FFT processing window. For example, in embodiments it is possible for two different actual frequencies to have the same or nearly the same aliased frequency values at a certain frame rate, which may result in an ambiguous analysis. However, this ambiguity may be avoided by selecting a pair of different frame rates, for which the corresponding aliased frequencies are different from each other. Most practical use cases would require only two selected frame rates for an unambiguous comparative analysis. However, some use cases may require three or more selected frame rates to avoid ambiguity, especially in situations with a large number of characteristic observed frequencies.

For example, in some embodiments, the method may include capturing a first video of a target area, wherein the first video is captured at a first frame rate; analyzing the first video and determining a first observed signal frequency in the first video; capturing a second video of the target area, wherein the second video is captured at a second frame rate; analyzing the second video and determining a second observed signal frequency in the second video; comparing the first observed signal frequency and the second observed signal frequency; and determining an actual signal frequency. Still further, the method may include capturing a third video of the target area, wherein the third video is captured at a third frame rate; analyzing the third video and determining a third observed signal frequency in the third video; and comparing the third observed signal frequency with the first observed signal frequency and/or the second observed signal frequency. Alternatively or additionally, in embodiments the method may include capturing a third video of the target area, wherein the third video is captured at a third frame rate; analyzing the third video and determining a third observed signal frequency in the third video; capturing a fourth video of the target area, wherein the fourth video is captured at a fourth frame rate; analyzing the fourth video and determining a fourth observed signal frequency in the fourth video; and comparing the third observed signal frequency and the fourth observed signal frequency.

In embodiments, the video recording may be analyzed for vibration, displacement, and other issues. The analysis or processing of the recordings may include extraction of signal data from the recording, including extraction of displacement data and other information. Such data may be extracted on a pixel-by-pixel basis as would be known in the art, where each pixel may for example provide a time-series data of light intensity measurement versus time.

The data processing and analysis may be performed after video acquisition, i.e., post-acquisition. Alternatively, the processing and analysis may be performed "on the fly" or "in-memory" as the scans are captured, and an analysis may be generated, with or without saving the raw video recordings.

The analysis may include calculating a motion or vibration of an observed object. In some embodiments, the motion may be an unexpected or undesired motion, for example, due to a defect, abnormality, or other issue. In some embodiments, the motion calculations may include displacement, velocity, and/or acceleration of the observed object, for example, at the actual signal frequency. In an embodiment, such data may be analyzed on a pixel-by-pixel basis as would be known in the art.

The analysis may also include the creation/generation of video representations showing the detected motion. Altered, enhanced, modified, and/or magnified videos may also be used, either as part of the initial creation/generation or by further processing. For example, displacement and/or motion may be increased, scaled, magnified, amplified, or otherwise changed so that the displacement and/or motion is more noticeable. Also, altered videos accurately describing the observed motion can be reproduced at frame rates different from the acquisition camera rates. For example, an altered video for a high-frequency motion may be reproduced at the frame rate 10 to 100 times higher than the actual frequency, which each frame is calculated from the FFT spectra data for the corresponding actual frequency. The altered videos can be played back and exported at different playback speeds, either slow motion, normal or accelerated playback modes.

Figure 9:
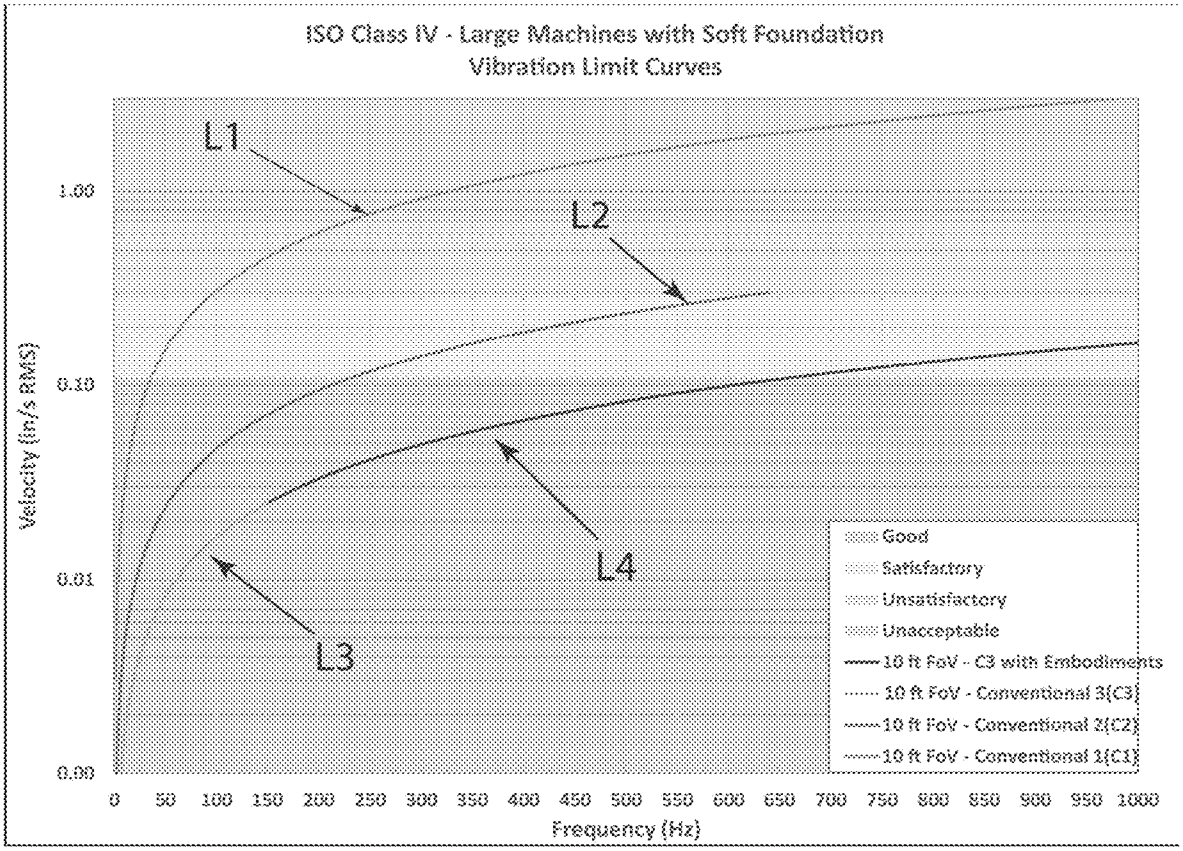
FIG. 9 depicts an ISO Class IV—Large Machines with Soft Foundation Specification for vibration along with limit lines of conventional camera systems and a high frequency video system according to embodiments of the present invention.

Vibration detection is discussed in more detail with respect to FIG. 9. FIG. 9 depicts an ISO Class IV—Large Machines with Soft Foundation Specification for Vibration. Vibration velocity (in/s RMS) is shown on the vertical axis and is divided into four zones, good, satisfactory, unsatisfactory, and unacceptable. As shown, for this class of machines, small vibrations (up to approximately 0.3 in/s RMS) are considered acceptable (good or satisfactory). Larger vibrations are flagged as problematic (unsatisfactory or unacceptable).

In order to evaluate vibration velocity according to this scale, sensor systems must be able to detect the vibration. Vibration limit curves showing detection limits of various conventional camera systems are shown. For example, vibration limit curves are shown for exemplary conventional cameras C1, C2, and C3 using a 10-foot field of view. The conventional cameras C1, C2, and C3 differ in their typical frame rates, light sensitivities and price ranges. For example, the higher price camera C1 is characterized by a high maximum frame rate in excess of 2000 frames per second and motion detection threshold of 1.4 mils peak-to-peak (pk-pk) at 10-foot field of view. The middle price camera C2 is characterized by a medium maximum frame rate in excess of 1200 frames per second and motion detection threshold of 0.15 mils pk-pk at 10-foot field of view. Finally, the lower price camera C3 is characterized by a low maximum frame rate of about 300 frames per second and motion detection threshold of 0.05 mils pk-pk at 10-foot field of view. The lower detection limit on lower priced cameras may be due to for example their relatively better sensitivity, lower noise performance, and/or larger sensor size in comparison to higher priced cameras. The limit lines depict the vibration detection (in/s RMS) limit at respective frequency (Hz). Vibration amounts above the limit line (larger than the limit line) can be detected and vibration amounts below the limit line (smaller than the limit line) cannot be detected by the respective camera.

For example, conventional camera C1's limit is shown as line L1 that very quickly crosses over into the unacceptable range of the chart, for example, at approximately 225 Hz. In fact, conventional camera C1 (line L1) is capable of providing detection of vibration under 0.10 in/s RMS only if the frequency of the vibration is well below 50 Hz. Likewise, at a frequency of 100 Hz, conventional camera C1 is only able to detect vibration that is already within the unsatisfactory range, i.e., over 0.3 in/s RMS. Thus, at frequencies higher than approximately 100 Hz conventional camera C1 is unable to detect any portions of the satisfactory vibration range. For vibration over 225 Hz, conventional camera C1 is unable to capture vibration in the good, satisfactory, and unsatisfactory ranges; C1 would only be able to capture vibration that is greater than 0.7 in/s RMS. Thus, conventional camera C1 is not useful for capturing or analyzing vibrations occurring at these higher frequencies. This limitation is due to a relatively high noise floor of conventional camera C1. Using a 10-foot field of view, conventional camera C1's sensitivity is not high enough to detect motion anything other than relatively large motion at higher frequencies.

Conventional camera C2's limit is shown as line L2. While conventional camera C2 demonstrates a better performance than C1, it is also incapable of detecting vibration smaller than 0.10 in/s RMS at frequencies higher than approximately 225 Hz. Further, at frequencies approaching 650 Hz, conventional camera C2 cannot detect vibration in the good and satisfactory ranges but can only detect unsatisfactory and unacceptable vibrations. In fact, conventional camera C2's maximum frequency range is limited to 650 Hz; conventional camera C2 cannot be used for detection of any vibrations occurring at approximately 650 Hz or higher with the full field of view. This limitation is due to both a limited frame rate of conventional camera C2 and its relatively high noise floor. Using a 10-foot field of view, conventional camera C2's frame rate is not high enough to detect acceptable range of motion at higher frequencies.

Conventional camera C3's limit is shown as the line L3. Conventional camera C3 demonstrates good detection of small vibrations up to approximately 150 Hz. However, the frequency range is limited to 150 Hz; conventional camera C3 cannot be used for detection of vibrations occurring at approximately 150 Hz or higher with the full field of view. This is due to the limited frame rate of conventional camera C3 when a 10-foot full field of view is used.

However, line L4 shows the limit of conventional camera C3 using embodiments of the disclosed invention. The same full field of view is used as with L1-L3; however, this field of view is captured using multiple recordings to detect the actual signal frequency. This may be used to effectively extend the high frequency cut-off point of the L3 curve to much higher frequencies. For example, as shown in the figure, using the disclosed methods, conventional camera C3 can be used to detect vibration at all frequencies on the chart. Further, conventional camera C3 would be able to detect any unsatisfactory or unacceptable vibration (as determined by the ISO Class IV Specification) at all depicted frequencies, e.g., up to 1,000 Hz. Equivalently, this approach may be used to increase the observed field of view while maintaining the same screen resolution, for example from 10 ft to 20 ft, to allow simultaneous observation of larger objects or multiple objects vibrating at high frequencies or moving at high velocities that are still within the good and satisfactory ranges of motion. Thus, embodiments of the present invention performed using conventional camera C3 would ensure that any problematic vibration would be detected regardless of frequency, even though conventional camera C3 is typically insufficient for this analysis.

Using embodiments of the disclosed invention as discussed above, detection can be improved even for relatively low cost or low speed cameras. Thus, hardware costs may be minimized while appropriate detection levels are still reached. Of course, embodiments of the disclosed invention may be also applied to high-cost and/or high-speed cameras and provide further improvements over their default detection capability.

Referring again to FIG. 7, embodiments of the method 700 may begin with an additional step, wherein the target area is provided (not depicted) and/or wherein an exposure time is provided (not depicted). In embodiments, the video sensor system may comprise at least one of the following different sensor systems, such as an optical sensor array, an RF sensor array, infrared or thermal camera, an X-ray sensor array or camera, or other electrical or optical sensor arrays capable of capturing and recording spatially and temporally varying measurements, e.g., measurements of electro-magnetic radiation or light intensity. Alternatively, the video system may include a plurality of the same or different video sensor types described above.

Alternatively, the video sensor may be a different type of electrical, magnetic, optical, acoustic or mechanical sensor that may produce video-like data or measurements, i.e., an array (one, two, or multi-dimensional array) of real-time measurements of some physical property or properties of one or multiple objects. Data position and associated indices in this data array may be correlated with specific spatial positions in the target area. For example, such a sensor may be a line or area scanner producing an array of measurements, each corresponding to a particular scanner direction. For example, in a range scanner each measurement would correspond to a range in a given direction.

The target area may include objects of interest that are measured or recorded, or objects of interest with associated events, e.g., synchronization events. The target area may be continuous or comprised of multiple regions or areas. The provided video sensor system may be characterized by a maximum field of view, which provides a complete coverage of the target area and/or objects of interest within the target area.

The method 700 may further include steps, in which the recordings may be analyzed for at least one of motion and vibration. The analysis may show unwanted vibration, movement, or other information with respect to the target area or an object of interest located within the target area. It may also confirm absence of unwanted or excess vibration in a healthy machine, aiding in a "wellness evaluation" of the machine. In embodiments, displacement, velocity, and/or acceleration at the actual frequency signal may be calculated. The knowledge of actual signal frequencies is critical for this analysis, since any uncertainty in determining signal's actual frequency prevents calculations of the object velocity and acceleration. For example, in the frequency domain, the velocity can be calculated by multiplying the displacement by the actual angular frequency, and the acceleration can be calculated by multiplying the velocity by the actual angular frequency. Thus, an incorrect estimate of the actual signal frequency will lead to an incorrect measurement of the corresponding velocity. The same is true for the acceleration, which is calculated in the frequency domain by multiplying the velocity magnitude by the actual frequency.

The acquired video recordings in method 700 may be processed and analyzed individually or together. The video data may be processed on a pixel-by-pixel basis, in which each pixel serves as an individual light sensor producing a time-series data recording local light intensity. Alternatively, multiple pixels may be grouped and processed together to speed up the analysis. For example, a group of pixels may correspond to a specific region of interest in the field of view containing a moving object of interest. One or more time series data set may be produced and analyzed for each recording in method 700. One or more regions of interest may be analyzed for each recording in method 700. Actual frequency comparisons may be done separately for each time-series, each region of interest, or entire fields of view.

Light intensity variations that are due to object motion may be also transformed into corresponding displacements by normalizing the resulting data series to the local image intensity gradient. Furthermore, time-series data may then be converted to a frequency domain using a Fourier transform, such as an FFT transform. One or more characteristic frequency spectra or FFT spectra may be produced for each recording in method 700.

In embodiments, the resulting FFT spectra may contain one or more characteristic frequencies as illustrated in FIGS. 3-6. The FFT spectra from the same region of the target area produced using videos recorded at different frame rates may be similar except for aliased frequencies, if any, which depend on and shift with the frame rate used in the recording. Comparing these FFT spectra allows one to identify the aliased frequencies and determine the actual signal frequencies as described above.

Figure 10:
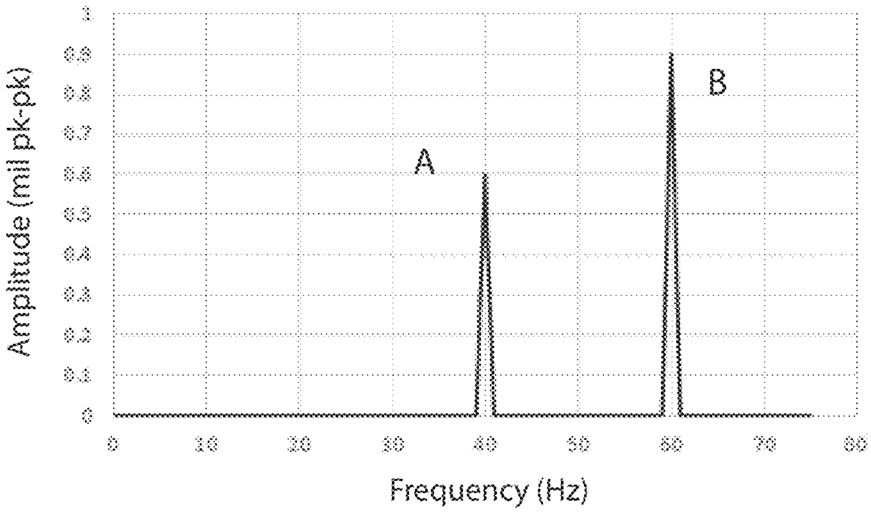
FIG. 10 depicts a first exemplary FFT spectrum obtained for a region of interest using a frame rate of 150 fps.
Figure 11:
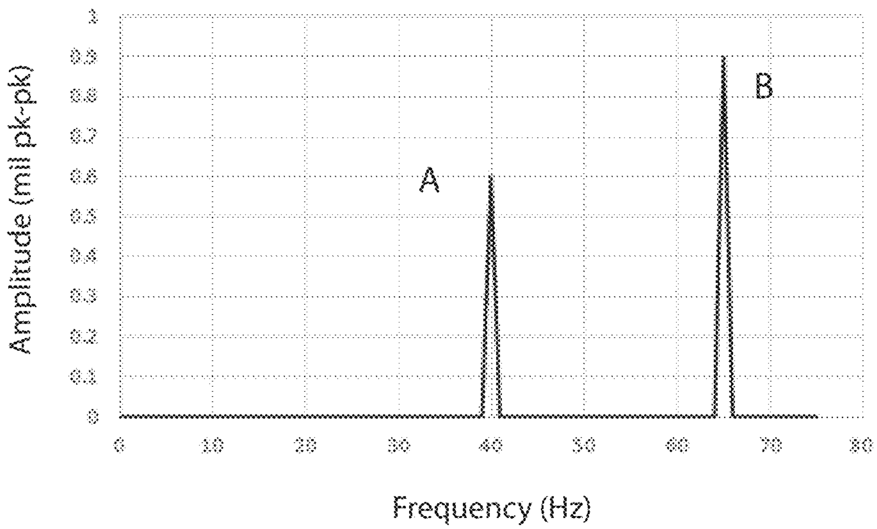
FIG. 11 depicts a second exemplary FFT spectrum obtained for the region of interest in FIG. 10 using a frame rate of 152.5 fps.
Figure 12:
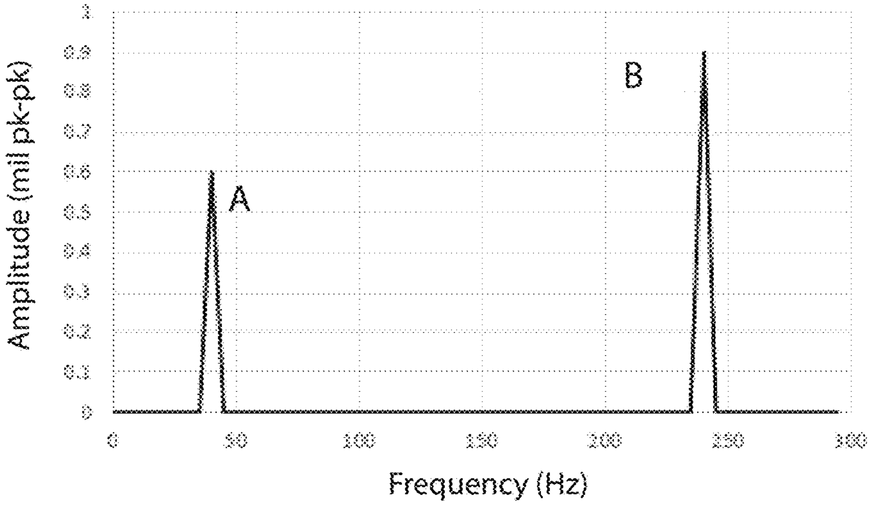
FIG. 12 depicts a transformation of the FFT spectra in FIGS. 10 and 11 to produce a reconstructed frequency spectrum containing the actual signal FFT spectrum showing the actual frequency positions.

For example, FIG. 10 shows an exemplary $FFT_1$ spectrum obtained for a region of interest using a frame rate $R_{f1}$ of 150 fps (frames per second) and FIG. 11 shows an exemplary $FFT_2$ spectrum obtained for the same region of interest using a frame rate $R_{f2}$ of 152.5 fps. A comparison between these spectra shows that the frequency peak labeled A corresponds to an unaliased signal at the actual frequency of 40 Hz, because it doesn't shift with the frame rate. On the other hand, the frequency peak labeled B corresponds to an aliased signal, because it changes with the frame rate and the actual frequency of 240 Hz can be calculated using Equation 2, as follows. Since the shift between the observed frequencies B in FIGS. 10 and 11 (65−60=5 Hz) is twice the change in the frame rate (152.5−150=2.5 FPS or Hz), N in Equation 2 is equal to 2. And since the observed frequency increases as the frame increases (65 Hz>60 Hz and 152.5 Hz>150 Hz), the sign in the Equation 2 is positive. Thus using the information from FIG. 10, the actual signal frequency can be deduced using Equation 2 as $F_a$=2*150−60=240 Hz. Or alternatively and equivalently, the actual signal frequency can be also deduced using the information from FIG. 11 and Equation 2 as $F_a$=2*152.5−65=240 Hz. As a result of this analysis, the two FFT spectra in FIGS. 10 and 11 can be transformed to produce a reconstructed frequency spectrum containing the actual signal FFT spectrum shown in FIG. 12, which shows the actual frequency positions for both peaks A and B.

Referring again to methods of embodiments of the invention, for example, the method 700, in embodiments, the method may include the step of producing an actual frequency spectrum. Still further, in embodiments, the method may include the step of producing a frequency transform map, which maps the observed characteristic frequencies in the target area to their actual signal frequencies. The frequency transform map may comprise amplitude and phase transformations between the observed and actual signal frequencies. This frequency transform map may then be applied to other recordings of the same target area or a different target area with the same characteristic frequencies. In this case, the method 700 may include additional and optional steps of selecting a different target area, recording additional videos at the same or different frame rates, producing characteristic observed frequency spectra and applying the previously obtained frequency transform map to produce the actual frequency spectra for the new target area. Also, in embodiments it may be useful to produce multiple frequency transform maps, e.g., corresponding to different regions of interest. This situation may arise if, for example, the target area includes different objects experiencing different types of motions unrelated to each other.

The method 700 may further include an optional step, in which a video may be reconstructed using the reconstructed frequency spectrum described above. In this video reconstruction processing step, one or more actual signal frequency components may be used, i.e., the frequencies of interest. Furthermore, this reconstructed video may be further altered to magnify the observed motion at the frequencies of interest. Consequently, the resulting video may be used to better illustrate potentially critical vibrations that are normally not detectable with prior art approaches. The video alterations may include altering pixel magnitude values to magnify the apparent range of motion and calculating video frames at arbitrary time intervals (e.g., at intervals much smaller than the acquisition time interval). The degree of motion magnification at each pixel may be proportional to the signal magnitude at the actual frequency for a given pixel. The calculation of each pixel in a video frame at an arbitrary time may also use the signal phase at the actual frequency for a given pixel.

Further, in some embodiments, additional processing or editing may be performed on the video. For example, the video data may be analyzed and filtered to remove or correct unwanted artifacts. The exposure correction can be applied for motions at high frequencies, as described in U.S. patent application Ser. No. 17/951,961, the entire contents of which are hereby incorporated by reference. The time series data may be reconstructed from the frequency domain using for example an inverse FFT transform and/or filtered out using a low-pass, high-pass or bandpass filter. This may be used for example to filter out light flicker artifacts at 60 Hz and 120 Hz (or at 50 Hz and 100 Hz outside the US). In addition, the analyzed motion may be magnified, amplified, or otherwise altered to more clearly show the detected/calculated motion/vibration. For example, movement may be increased, scaled, magnified, amplified, exaggerated, or otherwise changed so that the movement is more noticeable. This may be performed during the creation of the video representation, or may be performed separately, i.e., after creation of the video.

Furthermore, the method 700 may include capturing synchronized videos or measurements that are repeated over the target area. The repeated videos or measurements may be averaged on a pixel-by-pixel basis, as described in U.S. patent application Ser. No. 17/345,798, the entire contents of which are hereby incorporated by reference, to improve video or measurement quality, reduce noise, and extract more accurate data sets describing observed motion in the target area.

In addition, the processed data may be normalized, the differences in signal intensities can be removed or reduced to produce normalized signals, in order to simplify the FFT spectra comparison.

In still further embodiments, the method 700 may also include a data calibration step to transform the calculated displacement, velocity, and/or acceleration values from a sensor scale as measured in pixels to a target area scale, i.e., from the lens imaging plane to the target or object plane. The calibration factor may be determined from the distance between the sensor and the target area, the camera lens focal distance and the sensor pixel pitch, as known in the art.

In embodiments, the method 700 may also utilize stereo cameras to acquire video recordings at different frame rates. In this case, an additional step of stereo image and video analysis may be conducted to produce a 3D representation of the observed objects and their motions. The stereo cameras may be synchronized to allow simultaneous recording of their corresponding videos.

Aspects of the present invention are described herein with reference to the flowchart illustrations. It will be understood that each block of the flowchart illustrations can be implemented by computer-readable program instructions.

Figure 13:
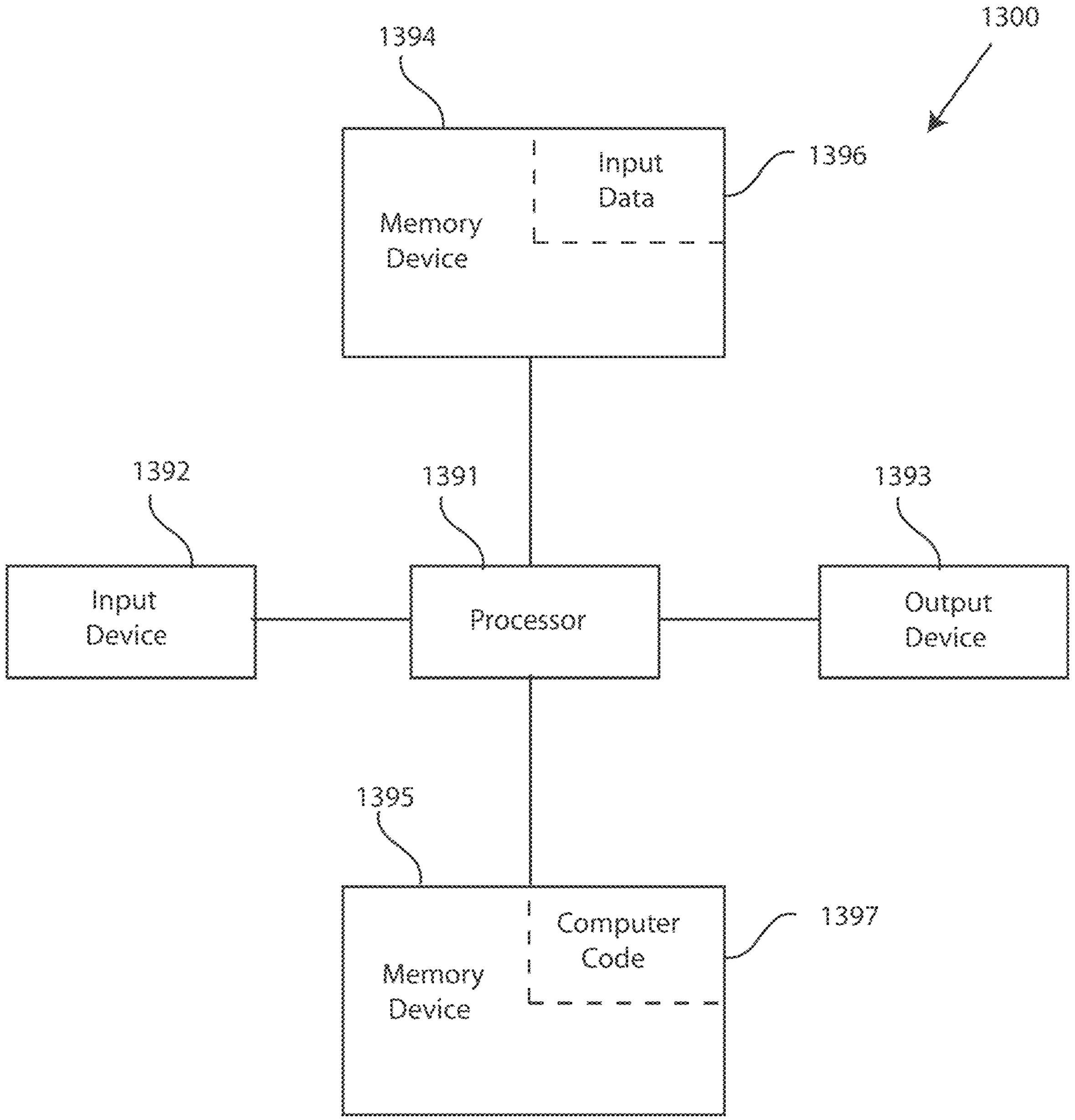
FIG. 13 depicts a block diagram of a computer system for a system of FIG. 8 capable of implementing a method for high-rate composite video acquisition of FIG. 7 in accordance with embodiments of the present invention.

FIG. 13 depicts a block diagram of a computer system 1300 for a system such as system 800 of FIG. 8, capable of implementing methods for high-frequency video acquisition of FIG. 7 in accordance with embodiments of the present invention. The computer system 1300 may generally comprise a processor 1391, an input device 1392 coupled to the processor 1391, an output device 1393 coupled to the processor 1391, and memory devices 1394 and 1395 each coupled to the processor 1391. The input device 1392, output device 1393 and memory devices 1394, 1395 may each be coupled to the processor 1391 via a bus. Processor 1391 may perform computations and control the functions of computer system 1300, including executing instructions included in the computer code 1397 for the tools and programs capable of implementing a method for high-rate video acquisition in the manner prescribed by the above embodiments, wherein the instructions of the computer code 1397 may be executed by processor 1391 via memory device 1395. The computer code 1397 may include software or program instructions that may implement one or more algorithms for implementing the method for detection, as described in detail above. The processor 1391 executes the computer code 1397. Processor 1391 may include a single processing unit, or may be distributed across one or more processing units in one or more locations (e.g., on a client and server).

The memory device 1394 may include input data 1396. The input data 1396 includes any inputs required by the computer code 1397. The output device 1393 displays output from the computer code 1397. Either or both memory devices 1394 and 1395 may be used as a computer usable storage medium (or program storage device) having a computer-readable program embodied therein and/or having other data stored therein, wherein the computer-readable program comprises the computer code 1397. Generally, a computer program product (or, alternatively, an article of manufacture) of the computer system 1300 may comprise said computer usable storage medium (or said program storage device).

Memory devices 1394, 1395 include any known computer-readable storage medium, including those described in detail below. In one embodiment, cache memory elements of memory devices 1394, 1395 may provide temporary storage of at least some program code (e.g., computer code 1397) in order to reduce the number of times code must be retrieved from bulk storage while instructions of the computer code 1397 are executed. Moreover, similar to processor 1391, memory devices 1394, 1395 may reside at a single physical location, including one or more types of data storage, or be distributed across a plurality of physical systems in various forms. Further, memory devices 1394, 1395 can include data distributed across, for example, a local area network (LAN) or a wide area network (WAN). Further, memory devices 1394, 1395 may include an operating system (not shown) and may include other systems not shown in FIG. 13.

In some embodiments, the computer system 1300 may further be coupled to an Input/output (I/O) interface and a computer data storage unit. An I/O interface may include any system for exchanging information to or from an input device 1392 or output device 1393. The input device 1392 may be, inter alia, a keyboard, a mouse, etc. or in some embodiments the touchscreen of a computing device. The output device 1393 may be, inter alia, a printer, a plotter, a display device (such as a computer screen), a magnetic tape, a removable hard disk, a floppy disk, etc. The memory devices 1394 and 1395 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 1300, and may include any type of transmission link, including electrical, optical, wireless, etc.

An I/O interface may allow computer system 1300 to store information (e.g., data or program instructions such as program code 1397) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to detection and analysis of motion. Thus, an embodiment of the present invention discloses a process for supporting computer infrastructure, where the process includes providing at least one support service for at least one of integrating, hosting, maintaining and deploying computer-readable code (e.g., program code 1397) in a computer system (e.g., computer system 1300) including one or more processor(s) 1391, wherein the processor(s) carry out instructions contained in the computer code 1397 for detection and analysis of motion. Another embodiment discloses a process for supporting computer infrastructure, where the process includes integrating computer-readable program code into a computer system 1300 including a processor.

The step of integrating includes storing the program code in a computer-readable storage device of the computer system 1300 through use of the processor. The program code, upon being executed by the processor, implements a method for detection and analysis of motion or vibration. Thus, the present invention discloses a process for supporting, deploying and/or integrating computer infrastructure, integrating, hosting, maintaining, and deploying computer-readable code into the computer system 1300, wherein the code in combination with the computer system 1300 is capable of performing a method for detection and analysis of motion.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, C#, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
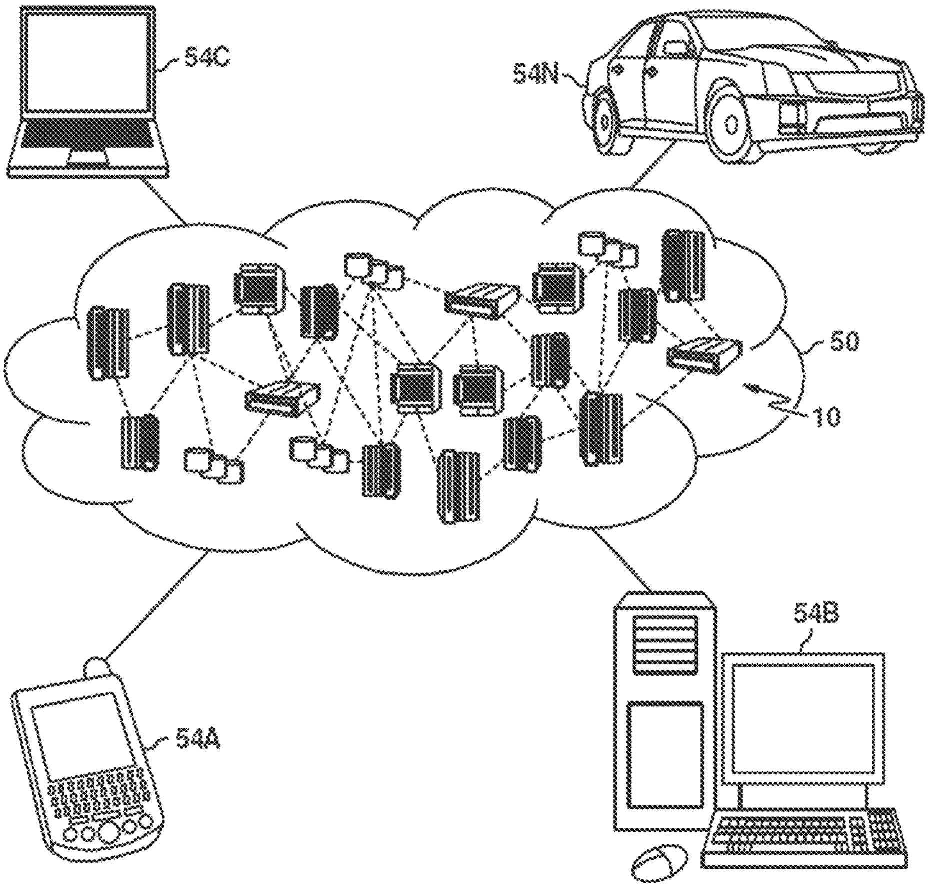
FIG. 14 depicts a cloud computing environment, in accordance with embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 14 are intended to be illustrative only and that computing nodes 10 and cloud computing environment 50 can communicate with any type of computerized device over any type of network and/or network addressable connection (e.g., using a web browser).

Figure 15:
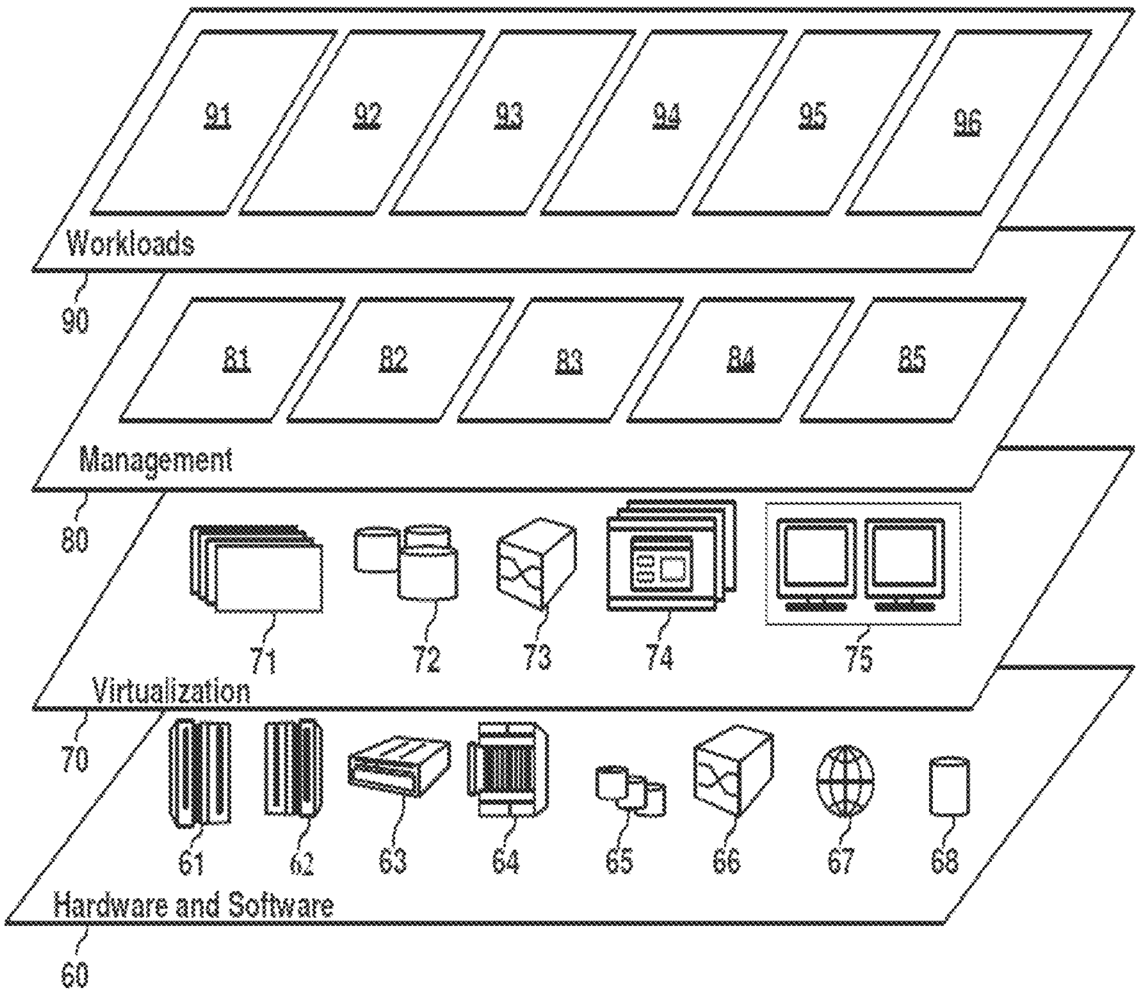
FIG. 15 depicts abstraction model layers, in accordance with embodiments of the present invention.

Referring now to FIG. 15, a set of functional abstraction layers provided by cloud computing environment 50 (see FIG. 14) are shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and high frequency video acquisition 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for high-frequency video acquisition, comprising:
- providing a video sensor;
- providing a target area;
- providing at least two frame rates;
- capturing at least two videos of the target area at the at least two frame rates;
- analyzing the at least two videos and producing corresponding frequency spectra;
- determining and comparing observed signal frequencies in the corresponding frequency spectra; and
- determining an actual signal frequency.

2. The method of claim 1, wherein the target area includes an object and at least one of motion and/or vibration of the object is analyzed.

3. The method of claim 1, wherein the determining the actual frequency comprises correlating observed signal frequencies and calculating a frequency shift between the correlated observed frequencies.

4. The method of claim 1, further comprising producing an actual signal frequency spectrum.

5. The method of claim 1, further comprising producing a frequency transform map between the observed signal frequencies and the actual signal frequency.

6. The method of claim 1, further comprising producing an altered video using the actual frequency signal.

7. The method of claim 1, further comprising applying an exposure correction factor to a signal of the actual signal frequency.

8. The method of claim 1, further comprising calculating displacement, velocity, or acceleration at the actual signal frequency.

9. The method of claim 1, further comprising providing a synchronization source and synchronizing the capturing.

10. The method of claim 1, further comprising providing an exposure time.

11. A computer program product, comprising a computer readable hardware storage device storing a computer readable program code, the computer readable program code comprising an algorithm that when executed by a computer processor of a computing system implements a method for high-frequency video acquisition, the method comprising:
- providing at least two videos of a target area, wherein the at least two videos are at different frame rates;
- analyzing the at least two videos and producing corresponding frequency spectra;
- determining and comparing observed signal frequencies in the corresponding frequency spectra; and
- determining an actual signal frequency.

12. The computer program product of claim 11, wherein determining the actual frequency comprises correlating the observed signal frequencies and calculating a frequency shift between the correlated observed frequencies.

13. A method for high-frequency video acquisition, comprising:
- capturing a first video of a target area, wherein the first video is captured at a first frame rate;
- analyzing the first video and determining a first observed signal frequency in the first video;
- capturing a second video of the target area, wherein the second video is captured at a second frame rate;
- analyzing the second video and determining a second observed signal frequency in the second video;
- comparing the first observed signal frequency and the second observed signal frequency; and
- determining an actual signal frequency.

14. The method of claim 13, wherein analyzing the first video and/or the second video includes producing a first frequency spectrum and/or a second frequency spectrum.

15. The method of claim 13, wherein determining the actual frequency comprises correlating the first observed signal frequency and the second observed signal frequency and calculating a frequency shift.

16. The method of claim 13, further comprising producing an actual signal frequency spectrum.

17. The method of claim 13, further comprising:
capturing a third video of the target area, wherein the third video is captured at a third frame rate;
analyzing the third video and determining a third observed signal frequency in the third video; and
comparing the third observed signal frequency with the first observed signal frequency and/or the second observed signal frequency.

18. The method of claim 13, further comprising:
capturing a third video of the target area, wherein the third video is captured at a third frame rate;
analyzing the third video and determining a third observed signal frequency in the third video;
capturing a fourth video of the target area, wherein the fourth video is captured at a fourth frame rate;
analyzing the fourth video and determining a fourth observed signal frequency in the fourth video; and
comparing the third observed signal frequency and the fourth observed signal frequency.

19. The method of claim 13, further comprising wherein the target area includes an object and at least one of motion and/or vibration of the object is analyzed.

20. The method of claim 13, further comprising producing an altered video using the actual frequency signal.

* * * * *